US005122219A

United States Patent [19]

Ludwig

[11] Patent Number: 5,122,219

[45] Date of Patent: Jun. 16, 1992

[54] APPARATUS FOR APPLYING FLUID, PASTY OR PLASTIC SUBSTANCES TO A SUBSTRATE

[76] Inventor: Volker Ludwig, Untere Muhlewiesen 10, D-7896 Wutoschingen, Fed. Rep. of Germany

[21] Appl. No.: 478,213

[22] Filed: Feb. 9, 1990

[30] Foreign Application Priority Data

Feb. 22. 1989 [DE] Fed. Rep. of Germany ....... 3905342

[51] Int. Cl.[5] ............................................ B29C 47/06

[52] U.S. Cl. ........................... 156/379.6; 156/244.11; 156/244.17; 156/244.23; 156/244.24; 156/244.27; 156/272.2; 156/272.8; 156/273.7; 156/379.7; 156/583.1; 156/583.5; 118/68; 118/202; 118/302; 118/323; 118/325

[58] Field of Search ...................... 156/244.11, 244.17, 156/244.23, 244.24, 244.27, 272.2, 273.7, 379.6, 379.7, 500, 583.1, 583.5, 272.8; 118/45, 60, 101, 202, 302, 323, 325; 425/113, 207, 224, 378.1, 384, DIG. 19, DIG. 243

[56] References Cited

U.S. PATENT DOCUMENTS

| | | | |
|---|---|---|---|
| 3,460,513 | 8/1969 | Hessel | 118/325 |
| 3,883,386 | 5/1975 | Garbini et al. | 156/583.5 |
| 3,930,923 | 1/1976 | Elliott | 156/244.23 |
| 4,671,205 | 6/1987 | Billeter | 118/323 |
| 4,938,835 | 7/1990 | Ludwig | 118/202 |

*Primary Examiner*—Caleb Weston
*Attorney, Agent, or Firm*—Bachman & LaPointe

[57] ABSTRACT

In a method of applying fluid, pasty or plastic substances, especially thermoplastics, to a substrate, the substance is melted, heated and applied via an outlet slit of a perforated cylinder to the substrate, the substrate then being lifted off from the cylinder. Provision is made here for the cylinder (3) to be connected to an energy source (17) and to be designed itself as a heat source for the substance.

21 Claims, 3 Drawing Sheets

Fig. 2
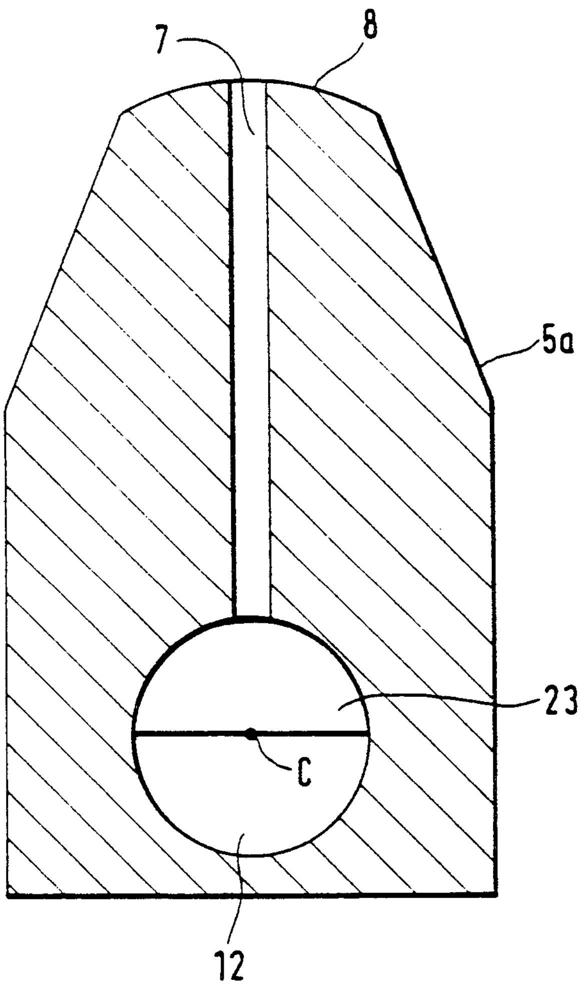
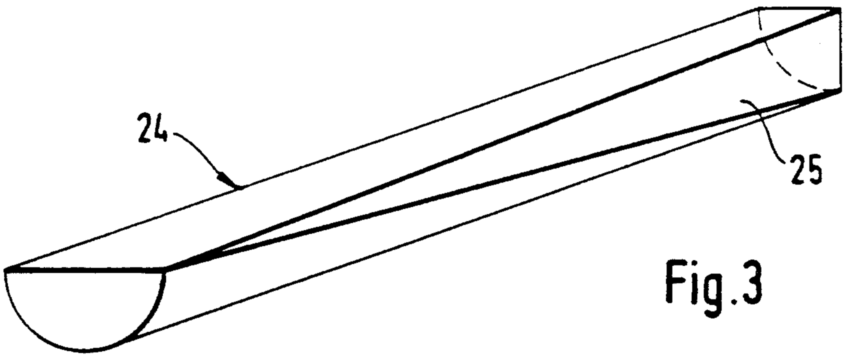
Fig. 3
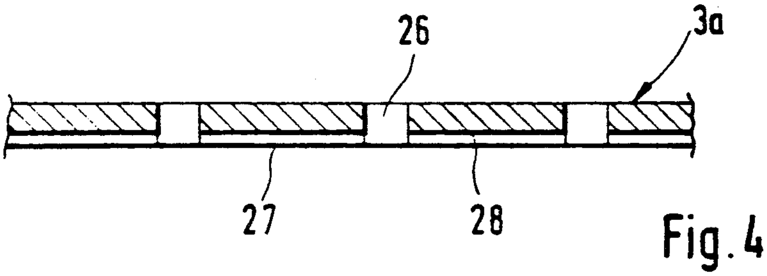
Fig. 4

APPARATUS FOR APPLYING FLUID, PASTY OR PLASTIC SUBSTANCES TO A SUBSTRATE

BACKGROUND OF THE INVENTION

The invention relates to a method of applying fluid, pasty or plastic substances, especially thermoplastics, to a substrate, in which the substance is melted, heated and applied via an outlet slit of a perforated cylinder to the substrate, which is then lifted off from the cylinder, as well as to an apparatus herefor.

An apparatus of this type is known, for example, from German Offenlegungsschrift 2,638,307.

The object of the present invention is to disclose further improvements for the application of the molten substance to the substrate and to influence the coating quality in a favorable manner.

SUMMARY OF INVENTION

This object is achieved in that firstly the cylinder is connected to an energy source and is itself designed as a heat source for the substance.

In hitherto known methods, the cylinder, which serves as a template for the coating, is at most irradiated with heat from the outside. In contrast, the fundamental idea of the present invention is to design the cylinder itself as a heat source, in which case it is preferably connected to a current source and hence serves as a resistance heater As a result it is possible to control the heating of the cylinder considerably more precisely, so that the effects of the heating of the cylinder on the coating itself can also be regulated. In practice, it has been shown that by heating the cylinder itself a substantial proportion of the liquid, which is present in the coating substance, is evaporated, and even the coating substance is "baked" or sintered. The quality of the coating is consequently substantially improved and the method is simplified, since drying ovens can be dispensed with. Moreover, in the case of pastes, for example, filaments are formed to a far lesser extent when the coated substrate is lifted off from the cylinder.

A sliding contact is preferably used for connecting the metal cylinder to the current source.

However, the invention also includes the fundamental idea that the filaments between the coating and the cylinder are removed after the coated substrate has been lifted off from the cylinder itself. This can be effected, on the one hand, by mechanical means, for example by cutting the filaments. However, radiation is preferred, for example heat irradiation, which is introduced or radiated in whatever form into the region between cylinder and coated substrate. A laser source which removes the filaments without further difficulties seems to be particularly suitable here. In addition, when it meets the coated substrate, the laser has the advantage that it melts and better interlaces the coating drops at the surface. This also substantially improves the quality of the coating. When removing the filaments, however, a cylinder lens which generates a linear focus may also be used.

It has furthermore proved in the past that, during punctiform coating of the substrate for example, tails form at the coating points when the substrate is lifted off from the cylinder In order to remove these tails, the coated substrate is passed through a heat zone after it has been lifted off from the cylinder, which causes the tails to be drawn back into the coating drops again. The type of apparatus used as a heat zone is of lesser significance.

Normally, an additional web of material is usually only applied to the coated substrate after the coating of the substrate, for which it is then again necessary to supply heat to the coated substrate or the coating substance so that the latter achieves its effectiveness for joining the web of material. The present invention also includes the idea that the web of material is applied to the coated substrate immediately after the latter has been lifted off from the cylinder, so that an additional work operation of reheating or keeping warm is eliminated. For this purpose, it would seem most favorable if a corresponding calender for feeding the web of material is associated with the lift-off roller itself.

A further improvement of the coating is effected by joining the individual dots to one another during the punctiform coating. For this purpose, channels interconnecting the corresponding openings for the punctiform coating are arranged on the surface of the cylinder.

An improvement to be especially emphasized relates to the supply of molten substance to the outlet slit of the coating head. In the known coating heads, the main chamber is connected continuously to the outlet slit. Once the molten substance is introduced into the main chamber, then molten substance already flows through the region of the outlet slit in the vicinity of the inlet for the substance, while the substance has still not yet reached the remote region of the outlet slit.

In order to distribute the molten substance evenly to the outlet slit, it has thus proved favorable if this substance is fed first to the region of the outlet slit remote from the inlet for the substance. This is done by means of a regulating element which is arranged in the main chamber and/or a separate throttling chamber. For instance, this regulating element may be a semicylinder which effects the closure of the outlet slit. If the semicylinder is rotated, then the region of the outlet slit remote from the inlet for the substance opens first. When the regulating element is rotated further, the entire outlet slit is successively retroactively opened. The mass coating is consequently evened out. If the regulating element is located in a separate throttling chamber, then its axis of rotation should be arranged in the plane of a wall of the outlet slit. A substantial improvement is also conferred by the arrangement of a vacuum chamber in front of the outlet slit, through which the perforations in the cylinder are evacuated, and hence possible air cushions which oppose the passage of the coating substance are removed.

These constitute overall a whole range of individual features which in total bring about a considerable improvement of the coating of a substrate with a corresponding substance.

BRIEF DESCRIPTION OF THE DRAWING

Further advantages, features and details of the invention emerge from the following description of preferred exemplary embodiments, as well as with reference to the drawing, in which.

FIG. 2 shows an enlarged cross-section through a coating head according to the invention;

FIG. 3 shows a perspective view of a regulating element for feeding substances to be applied;

FIG. 4 shows an enlarged representation of a partial longitudinal section through an application cylinder;

DETAILED DESCRIPTION OF THE INVENTION

Figure 1:
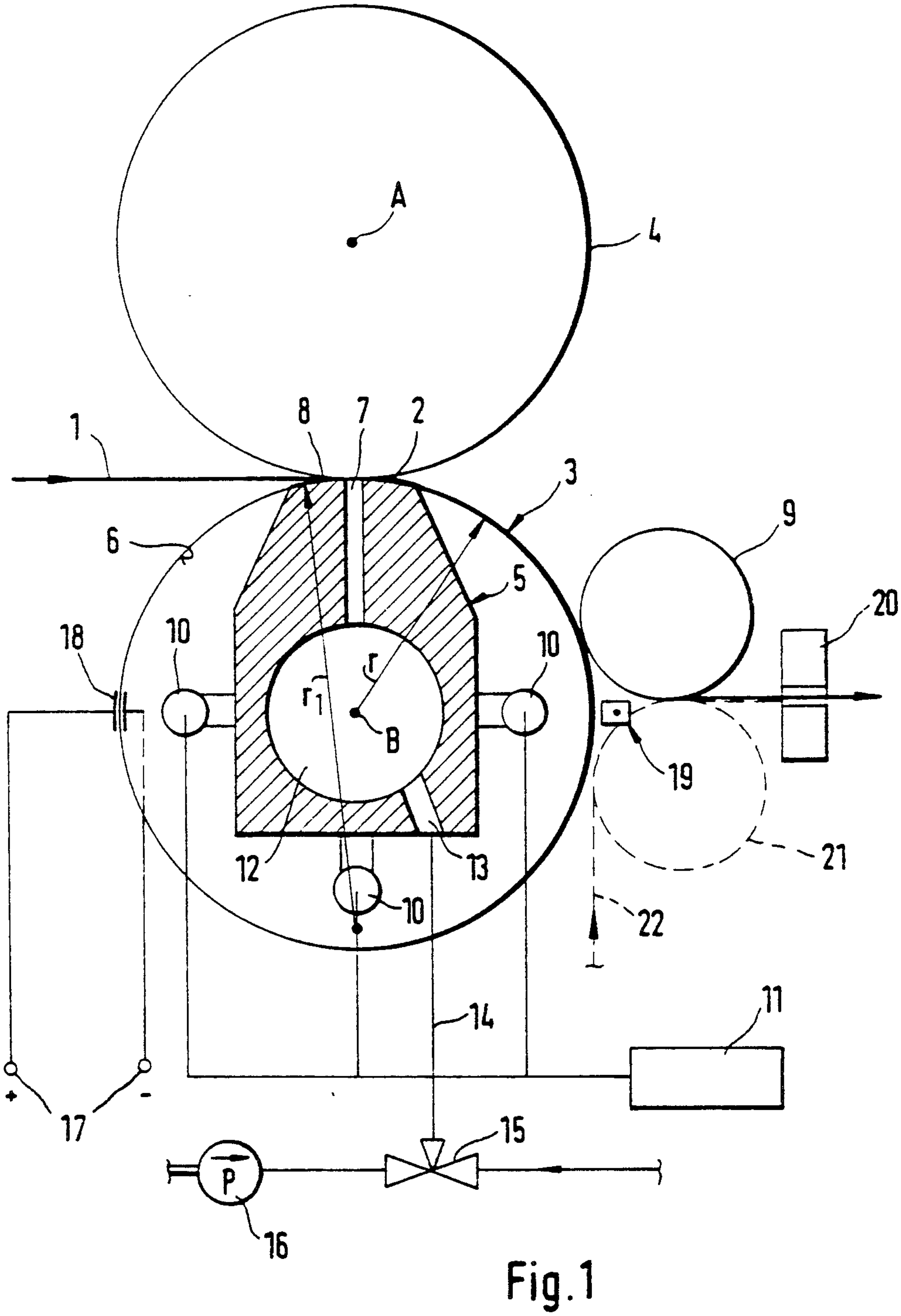
FIG. 1 shows a diagrammatic representation of an apparatus according to the invention for applying fluid, plastic or pasty substances to a substrate, partially represented as a block circuit diagram, partially in cross-section.

In accordance with FIG. 1, a substrate 1 to be coated runs from a supply roller, not shown in greater detail, into a coating slit 2. Said coating slit 2 is formed by a perforated cylinder 3, especially a metal cylinder, and a counterpressure roller 4.

The counterpressure roller 4 preferably consists of elastic material The distance between the axis of rotation A of the counterpressure roller 4 and the axis of rotation B of the cylinder 3 is less than the sum of the radii of cylinder 3 and counterpressure roller 4. As a result, in the region of the coating slit 2, the elastic counterpressure roller 4 is deformed by the pressure of the cylinder 3. This deformation is naturally also present when there is no coating slit formed between cylinder 3 and roller 4 in the narrower sense without substrate.

In the region of the coating slit 2, a coating head 5 presses against the inner surface 6 of the cylinder 3 from the interior of the cylinder 3. A contact surface 8 is thereby formed around an outlet slit 7 of the coating head 5, on either side of the outlet slit 7, said contact surface 8 having a radius r1 which is greater than the radius r of the cylinder 3. The cylinder 3 is consequently deformed slightly in this region, but the application of the substance by the cylinder 3 is improved since a more plane surface is formed opposite the counterpressure roller 4.

After the coating slit 2, the substrate 1 continues to run a certain distance on the cylinder 3, then lifts off and winds around a roller 9.

In the present exemplary embodiment, it is to be possible for the coating head 5 to be subjected to heat with heating elements 10, this heat treatment being controlled by a control unit 11. Furthermore, preceding the outlet slit 7 in the coating head 5 is a main chamber 12, which is in communication with a source of molten substance, not shown in more detail, via corresponding connecting channels 13 or supply lines 14. A three-way valve 15 can be connected into the line 14, via which the line 14 is alternately connected to the source of coating substance or to a vacuum pump 16.

In the present exemplary embodiment, it is envisaged according to the invention that the cylinder 3 itself becomes the heat source. By a connection to electrical terminals 17, the cylinder 3 becomes a resistor, which heats itself via the connection. The connection values may be around 2–10 volts and 700–900 Å. Sliding contacts 18, which are only illustrated diagrammatically, are suitable for transmitting the electrical energy. Towards the coating head 5, in the region of the contact surface 8, a corresponding insulation should then be present.

The design of the cylinder 3 as an independent heat source has substantial advantages with respect to the quality, of the punctiform coating applied for example. Hardly any tails projecting upwards are now formed at the clots, which was the case with the hitherto known coating methods.

Moreover, as is borne out by practice, a formation of filaments between cylinder 3 and the coating of the lifted-off substrate is reduced.

By virtue of the outlet region of the coating head (no wiper), the coating substance need only have a low moisture content. This is then also evaporated already more quickly and more completely by the heated cylinder, so that the moisture content of the substance can be drastically reduced. That is to say, the coating substance is already "baked" to a certain extent, which likewise enhances the quality of the coating.

In accordance with the invention, a device 19 for removing filaments, indicated only diagrammatically, is associated with the region between cylinder 3 and roller 9. This device 19 may on the one hand be designed mechanically, in which case, however, it has considerable disadvantages. The "filament cutting" should preferably be carried out using heat, in which case every conceivable source of heat is to be included in the inventive idea. However, a laser beam is also again preferably used here as a special heat source. The absorption spectrum of this laser beam should correspond approximately to the emission spectrum of the coating substance, as a result of which the substance is additionally altered and influenced by the laser beam, that is to say especially interlaced. In turn, this can increase the adhesive power, the dot is held together as with a net and does not spread out.

In a further exemplary embodiment of the invention, the roller 9 is to be followed by a heat zone 20, likewise only diagrammatically illustrated. As mentioned above, for instance in the case of punctiform coating by a thermoplastic substance, no tails form on the dots. It has emerged that, when the coated substrate 1 is passed through a heat zone 20, these tails are drawn in, and consequently the quality of the coating is in turn also substantially improved.

In accordance with the invention, it is furthermore possible to provide that a calender 21, which feeds a further web of material 22 to be joined to the coated substrate 1, is associated with the roller 9. This constitutes a further step for improving the automation, since a subsequent, new melting or heating of the substance applied to the substrate becomes unnecessary.

A further exemplary embodiment of a coating head 5*a* is shown in FIG. 2. With this coating head 5*a*, inserted in the main chamber 12 is a regulating element 23 which regulates the passage of molten substance from the main chamber 12 to the outlet slit 7. In the present exemplary embodiment, for the sake of simplicity, this regulating element 23 comprises a semicylinder 24 which is rotatable about its longitudinal axis C. In particular, it is shown in FIG. 3 that a part of this semicylinder 24 has a conical ground face 25.

For controlling the passage of molten substance from the main chamber 12 into the outlet slit 7, the semicylinder 24 is inserted into the main chamber 12 in such a way that its end with the largest ground face is remote from the inlet of the substance into the main chamber 12. If the passage between main chamber 12 and outlet slit 7 is thus slowly opened by rotating the semicylinder 24 about its longitudinal axis C, then an opening occurs first remote from the inlet for the substance. The substance is thus forced to penetrate as far as possible into the main chamber 12, so that consequently the mass application can be evened out over the entire length of the outlet slit 7.

Form and length of the conical ground face 25 are indicated only diagrammatically in FIG. 3. Depending on requirements, and depending on the viscosity of the substance, for example, this form may differ.

The inventive idea also includes a refinement of the cylinder 3 itself. In many cases, it would seem desirable for not only a punctiform coating of the substrate 1 to be carried out, but also to join the dots together with coating lines. For this purpose, according to the invention a cylinder 3*a* in accordance with FIG. 4 not only has openings 26 for the punctiform coating, but also the individual openings 26 are interconnected by channels 28 formed into the surface 27 of the cylinder 3*a*. This results in a grid-like application of the coating.

Figure 5:
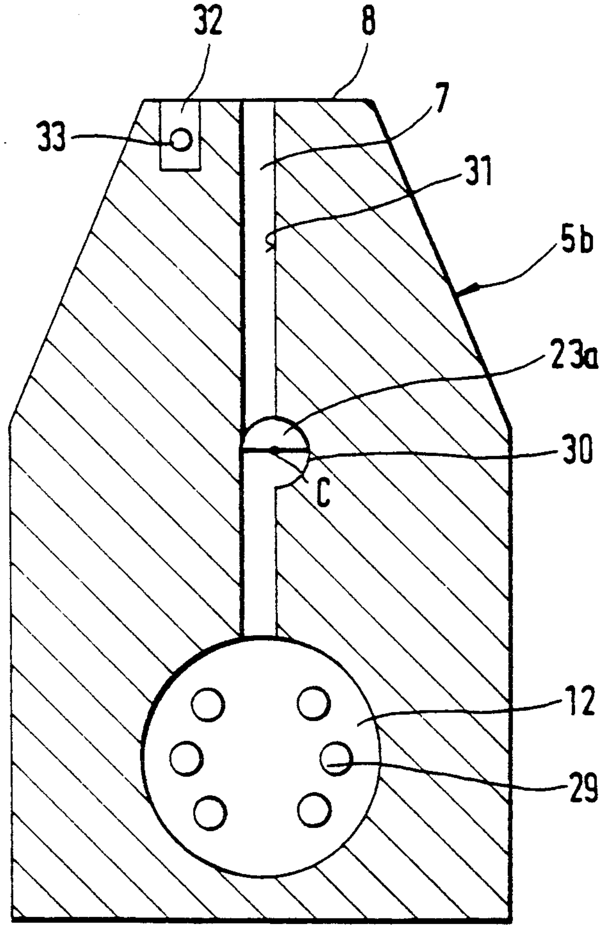
FIG. 5 shows a cross-section through a further exemplary embodiment of a coating head according to the invention.

In the further exemplary embodiment of a coating head 5*b* in accordance with FIG. 5, heating tubes 29 are arranged in the main chamber 12. A hot oil, for instance, is carried in these heating tubes 29, so that the coating substance in the main chamber 12 is kept at a particular heat level.

It is furthermore envisaged in this exemplary embodiment that the regulating element 23*a* is located not in the main chamber 12, but in a separate throttling chamber 30. In the exemplary embodiment in accordance with FIG. 5, the regulating element 23*a* is shown in the closed position for the outlet slit 7. Its longitudinal axis C preferably lies in the plane of a wall 31 of the outlet slit 7.

With the coating heads hitherto used, it was found that air remains in the openings 26 of the cylinder 3, while the cylinder travels over the contact surface 8 of the coating head 5*b*. This air acts as an air cushion and counteracts a coating. According to the invention, therefore, a vacuum chamber 32, which can evacuated via a corresponding line 33, should precede the outlet slit 7. When travelling over the openings 26 above this vacuum chamber 32, the air is evacuated out of these openings 26, so that it does not oppose the passage of the coating substance. In this way, too, the quality of the coating itself is substantially improved.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:

1. An apparatus for applying pasty substances to a substrate including a device for melting said substances and a coating head provided with outlet for transferring the molten substances onto the substrate via a perforated cylinder having an inner peripheral surface and a contact surface which forms, together with a counterpressure roller, a coating slit, following which the substrate is drawn off while undergoing partial winding around a roller, the improvement which comprises: the coating head having in the region of the outlet a curved contact surface in contact with the inner peripheral surface of the perforated cylinder wherein the radium of curvature of the curved contact surface of the coating head is greater than the radius of curvature of the perforated cylinder such that the perforated cylinder is deformed in the region of the coating slit around the outlet of the coating head whereby the contact time between the substrate and the perforated cylinder and contact pressure roller is increased.

2. An apparatus according to claim 1 wherein the perforated cylinder is connected to a current source.

3. An apparatus according to claim 2 wherein the perforated cylinder is connected to the current source via sliding contacts.

4. An apparatus according to claim 1 wherein the perforated cylinder is provided with a plurality of perforations and vacuum means is associated with the coating slit for evacuating the perforations.

5. An apparatus according to claim 1 wherein the perforated cylinder is provided with a plurality of perforations extending from the inner peripheral surface thereof to the contact surface thereof wherein the perforations are joined on the contact surface by channels.

6. An apparatus according to claim 1 wherein the coating head is provided with a main chamber having heating tubes for heating said molten substances prior to transferring the molten substances onto the substrate.

7. An apparatus according to claim 1 wherein the coating head is provided with a main chamber having means disposed therein for regulating the passage of the molten substances to the outlet of the coating head.

8. An apparatus according to claim 7 wherein said regulating means comprises a semi-cylinder of elongated element mounted in the main chamber about a longitudinal access (C) and further includes means for rotating said semi-cylinder member about said access.

9. An apparatus according to claim 7 wherein said semi-cylinder element has a conical ground face.

10. An apparatus according to claim 9 wherein the longitudinal access (C) is located in a plane of a wall of the outlet slit.

11. An apparatus according to claim 10 wherein said means for removing filaments comprises a laser.

12. An apparatus according to claim 1 wherein means are provided in the region where the coated substrate is lifted off the perforated cylinder for removing filaments.

13. An apparatus according to claim 1 wherein the heating means is provided downstream of the drawn off roller.

14. An apparatus according to claim 13 wherein a calendar for applying a material to the coated substrate interacts with the drawn off roller.

15. An apparatus for applying pasty substances to a substrate including a device for melting said substances and a coating head provided with outlet for transferring the molten substances onto the substrate via a perforated cylinder having an inner peripheral surface and a contact surface which forms, together with a counterpressure roller, a coating slit, following which the substrate is drawn off while undergoing partial winding around a roller, the improvement which comprises: sliding contacts connected to a current source in physical contact with said perforated cylinder for transmitting electrical energy thereto such that said perforated cylinder becomes a heat source.

16. An apparatus for applying pasty substances to a substrate including a device for melting said substances and a coating head provided with ouslet for transferring the molten substances onto the substrate via a perforated cylinder having an inner peripheral surface and a contact surface which forms, together with a counterpressure roller, a coating slit, following which the substrate is drawn off while undergoing partial winding around a roller, the improvement which comprises: the perforated cylinder having a plurality of perforations extending from the inner peripheral surface thereof to the contact surface thereof wherein the perforations are joined on the contact surface of the perforated cylinder by channels.

17. An apparatus for applying pasty substances to a substrate including a device for melting said substances and a coating head provided with outlet for transferring the molten substances onto the substrate vial a perforated cylinder having an inner peripheral surface and a contact surface which forms, together with a counterpressure roller, a coating slit, following which the substrate is drawn off while undergoing partial winding around a roller, the improvement which comprises: the coating head having a main chamber provided with heating tubes for heating the molten substances prior to transferring the molten substances onto the substrate and further including throttling means downstream of said main chamber for regulating the flow of molten substances to said substrate.

18. An apparatus for applying pasty substances to a substrate including a device for melting said substances and a coating head provided with outlet for transferring the molten substances onto the substrate via a perforated cylinder having an inner peripheral surface and a contact surface which forms, together with a counterpressure roller, a coating slit, following which the substrate is drawn off while undergoing partial winding around a roller, the improvement which comprises: means associated with the region where the coated substrate is lifted off the perforated cylinder for removing filaments.

19. An apparatus according to claim 18 wherein said means for removing filaments comprises a laser.

20. An apparatus for applying pasty substances to a substrate including a device for melting said substances and a coating head provided with outlet for transferring the molten substances onto the substrate via a perforated cylinder having an inner peripheral surface and a contact surface which forms, together with a counterpressure roller, a coating slit, following which the substrate is drawn off while undergoing partial winding around a roller, the improvement which comprises: heating means downstream of the drawn off roller.

21. An apparatus according to claim 20 wherein a calendar for applying a web of material to the coated substrate is associated with the drawn off roller.

* * * * *